United States Patent [19]

Leon

[11] Patent Number: 4,978,272

[45] Date of Patent: Dec. 18, 1990

[54] LOADER DECK COUNTER-ROTATING SIDE GUIDE ROLLERS

[75] Inventor: Michael A. Leon, Orlando, Fla.

[73] Assignee: FMC Corporation, Chicago, Ill.

[21] Appl. No.: 378,722

[22] Filed: Jul. 12, 1989

[51] Int. Cl.$^5$ .............................................. B65G 39/12
[52] U.S. Cl. .................................... 414/529; 198/787;
198/415; 193/35 MD; 414/495
[58] Field of Search ............... 414/495, 530, 529, 531,
414/532, 533, 534, 535, 536, 757, 754; 198/787,
781, 415, 416; 244/137.1; 193/35 MD

[56] References Cited

U.S. PATENT DOCUMENTS

| | | |
|---|---|---|
| 2,638,234 | 5/1953 | Corbitt et al. ................... 198/787 X |
| 3,447,665 | 6/1969 | Egeland et al. .......... 193/35 MD X |
| 4,019,627 | 4/1977 | Eggert et al. ..................... 198/787 X |
| 4,304,518 | 12/1981 | Carder et al. ........................ 414/495 |
| 4,312,619 | 1/1982 | Anderson et al. ............... 414/495 X |

FOREIGN PATENT DOCUMENTS

| | | | |
|---|---|---|---|
| 106227 | 5/1988 | Japan ............................ 193/35 MD |
| 1405933 | 6/1988 | U.S.S.R. ............................... 198/415 |
| 2174966 | 11/1986 | United Kingdom ................ 198/787 |

*Primary Examiner*—Frank E. Werner
*Attorney, Agent, or Firm*—Douglas W. Rudy; Richard B. Megley

[57] ABSTRACT

The present invention has to do with aircraft cargo handling and loading equipment and specifically with a type of roller deck surface employed thereon.

11 Claims, 2 Drawing Sheets

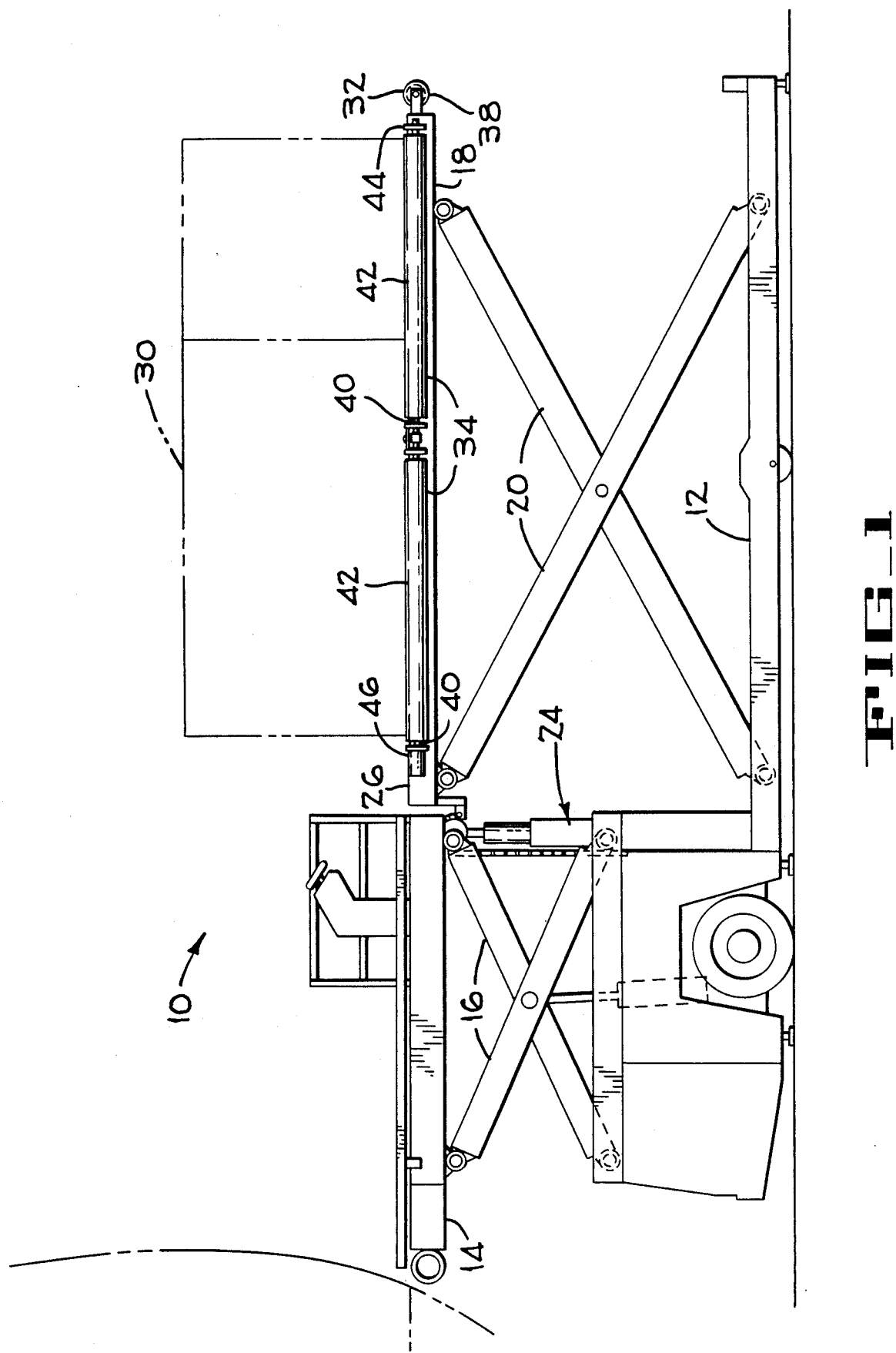
FIG_1

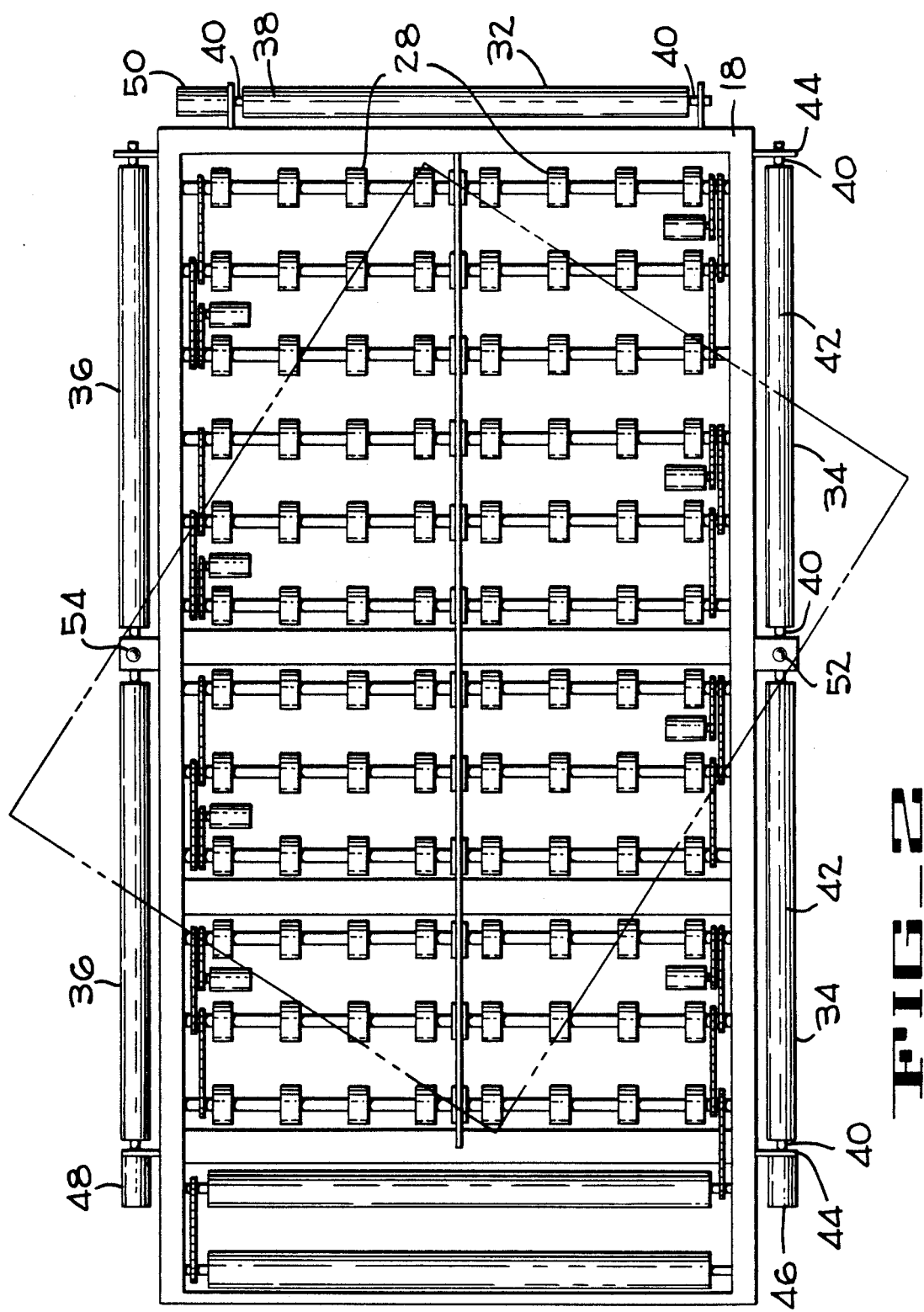
FIG_2

LOADER DECK COUNTER-ROTATING SIDE GUIDE ROLLERS

It is well known to provide a roller deck surface having conveyor means which permits a cargo container on the deck surface to be translated forward and rearward, toward either side and in any diagonal direction or to be rotated. The present invention improves on these deck surfaces by providing outboard elongated rollers that are driven in opposition to the direction of travel of a container on the platform. By driving these outboard rollers "against the flow" a certain measure of stability and control is introduced into the cargo handling operation.

These and other advantages and attributes of the present invention will become more readily apparent from a reading of the following description and the accompanying drawings wherein:

FIG. 1 is an elevation view of an aircraft cargo loader,

FIG. 2 is a top plan view of an embodiment of the present invention.

Referring now to FIG. 1, there is shown an aircraft cargo loader, indicated generally at 10, having a self-propelled frame 12 with a front platform 14 supported on a pair of scissors, one of which is shown as 16, and a rear platform 18 also supported on a pair of scissors, one of which is shown as 20. The rear platform 18 is elevated by a chain and hydraulic ram lift mechanism 24, which is of the type disclosed in U.S. Pat. No. 4,701,097 but may be any type of lift mechanism capable of elevating the rear platform relative to the frame 12.

The rear platform 18 includes a frame 26 which supports a plurality of roller elements 28 (FIG. 2) for allowing the shifting of a cargo container, or the like 30, which is shown in phantom view in FIG. 2.

Mounted on the outboard sides or the perimeter of the rear platform are elongated driven rollers such as 32. A first set of elongated rollers 34 are mounted on the frame structure 18 outboard of the plurality of roller elements 28. A second set of elongated rollers 36 are mounted on the frame structure 18 outboard of the plurality of roller elements 28 on the side of the frame structure opposite the first set of elongated rollers 34. A single elongated roller 38 is also mounted on the frame structure outboard of the plurality of roller elements on the side or end of the rear platform between the first and second sets of elongated rollers.

The first and second sets of elongated rollers have axle means such as 40 which support the body portion such as 42 of each of the elongated rollers in the two sets. Support means such as 44 accommodate the axle means 40 to support the rollers. The body portions 42 of the rollers are of a diameter such that the upper most portion of such rollers 42 are on the same plane with or level with the tops of the rollers 28.

Alternative embodiments could have these rollers higher, lower or adjustable relative to the roll plane surface (the plane level with the tops of rollers 28) of the rear deck surface.

The single elongated roller 38 is similarly constructed. It is supported on axle means 40 and has a roll surface with its uppermost portion, in a preferred embodiment, level with the roll plane surface of the rear deck.

All of the elongated rollers are capable of being driven. For instance, the first and second sets of elongated rollers are coupled to a motor 46 and 48, respectively. In a preferred embodiment a hydraulic motor is used, and the single elongated roller 38 is driven by a motor 50 which could be of smaller capacity.

As stated, the elongated rollers on the sides of the rear platform are coupled together so as to be driven responsive to either motor 46 or 48. The coupling is conventional and is located below the single roller bearing such as 52 and 54 which is provided to support a pallet traversing the area between the elongated rollers over the coupling zone.

The hydraulic motors are driven in a direction that serves to apply an inboard bias or directed bias to a pallet that is being rotated on the platform. That is, looking at FIG. 2, the phantom line pallet is being rotated counterclockwise to get it straight on the loader platform. As the roller elements rotate the pallet counterclockwise the elongated roller 34 at the first side of the platform will rotate counterclockwise (as viewed from the motor 46 end 46) while the elongated rollers 36 will rotate clockwise (as viewed from the motor 48 end). Roller 38 will rotate toward the platform during either clockwise or counterclockwise pallet rotation.

If the pallet is to rotate clockwise the first set of elongated rollers 34 will rotate counterclockwise and the second set 36 will rotate clockwise which is the same rotation whether the pallet is being rotated clockwise or counterclockwise. In any case the rollers are to rotate inwardly to provide at least some resistance to pallet rotation tending to urge the pallet inward rather than being simple undriven rollers or rollers driving in a direction to bias the pallet off the platform.

The hydraulic motors may be plumbed into the platform roller drive motors and controls to rotate when the platform rollers are driven or they can be plumbed independently to be operator engageable. They can of course be driven either clockwise or counterclockwise depending on the needs of positioning a pallet on the deck. For instance, the roller 38 can be driven counterclockwise (from the motor end) 50 to assist in loading a platform from the end of the platform. Similarly the side rollers can be rotated to assist pallet loading from the sides of the platform.

Although a pallet or container 30 has been illustrated and discussed herein it will be understood that such a pallet can be a flat bottomed article or a more convention pallet with several boards or supports for the base surface.

The present invention has been described herein as it is used in an aircraft loader but it is contemplated that this invention would also have application to a line conveyor in which articles are distributed to a plurality of conveyors.

While several embodiments of the invention are contemplated, for instance electric motors rather than hydraulic motors, it is understood that various changes and modifications may be made therein without departing from the spirit of the invention as defined by the scope of the appended claims.

What is claimed is:

1. In an aircraft loader having a powered deck structure including a frame supporting a plurality of selectively driven rollers rotatable about axes for allowing the shifting of a container on the deck surface, the improvement comprising:

a first set of one or more than one elongated rollers mounted on said frame structure outboard from said plurality of rollers and being rotatable about axes in a plane orthogonal to the axes of the selectively driven rollers;

a second set of one or more than one elongated rollers mounted on said frame structure outboard from said plurality of rollers and being rotatable about axes in a plane orthogonal to the axes of the selectively driven rollers;

a second set of one or more than one elongated rollers mounted on said frame structure outboard from said plurality of rollers and on the side of said frame structure opposite said first set of elongated rollers and being rotatable about axes in a plane orthogonal to the axes of the selectively driven rollers;

a single elongated roller mounted on said frame structure outboard from said plurality of rollers on the side of said frame structure between said first and second sets of elongated rollers being rotatable about an axis in a plane parallel to the axes of the selectively driven rollers:

independent means for driving each set of elongated rollers and said single elongated roller;

control means for directing the actuation of said plurality of rollers and said first set, second set and single elongated rollers.

2. The invention in accordance with claim 1 wherein said first set of elongated rollers and said second set of elongated rollers are driven by independent means for driving in a direction imparting inboard directed bias to said container as said container is shifted on said plurality of rollers.

3. The invention in accordance with claim 2 wherein said single elongated roller is driven by said independent means for driving in a direction imparting inboard directed bias to said container as said container is shifted on said plurality of rollers.

4. The invention in accordance with claim 3 wherein said independent means for driving is a hydraulic motor.

5. The invention in accordance with claim 3 wherein said independent means for driving is an electric motor.

6. The invention in accordance with claim 2 wherein said independent means for driving is a hydraulic motor.

7. The invention in accordance with claim 2 wherein said independent means for driving is an electric motor.

8. The invention in accordance with claim 1 wherein said first set of elongated rollers is driven by said independent means for driving when said plurality of selectively driven rollers are selectively driven.

9. The invention in accordance with claim 1 wherein said second set of elongated rollers is driven by said independent means for driving when said plurality of selectively driven rollers are selectively driven.

10. The invention in accordance with claim 1 wherein said first or said second set of elongated rollers and said single elongated roller is driven by said independent means for driving when said plurality of selectively driven rollers are selectively driven.

11. The invention in accordance with claim 1 wherein said single elongated roller is driven by said independent means for driving when said plurality of selectively driven rollers are selectively driven.

* * * * *